United States Patent [19]
Wood

[11] Patent Number: 5,710,722
[45] Date of Patent: Jan. 20, 1998

[54] AUTOMATED MINIMUM RESOLVABLE TEMPERATURE DIFFERENCE TEST FOR IMAGING INFRARED SYSTEMS

[75] Inventor: Samuel B. Wood, Hartselle, Ala.

[73] Assignee: The United States of America as represented by the Secretary of the Army, Washington, D.C.

[21] Appl. No.: 653,568

[22] Filed: May 24, 1996

[51] Int. Cl.⁶ .................................................. G01K 5/48
[52] U.S. Cl. .................................. 364/525; 364/557
[58] Field of Search ............................. 364/525, 579, 364/550, 524, 557; 348/164

[56] References Cited

U.S. PATENT DOCUMENTS 5,033,015  7/1991  Zwirn ......................... 364/579

Primary Examiner—James P. Trammell
Assistant Examiner—M. Kemper
Attorney, Agent, or Firm—Hugh P. Nicholson; Freddie M. Bush

[57] ABSTRACT

The Automated Minimum Resolvable Temperature Difference Tester employs the use of tracker based algorithms and automated collection techniques to measure the system's Minimum Resolvable Temperature Difference at various spatial frequencies. The system employs a tracker-type system to resolve bar targets. The system in use provides a means for heating or cooling the target such that a temperature difference between the target and the background is apparent. The temperature difference is then decreased until the algorithm can no longer resolve the target. The candidate tracker system also utilizes a correlation tracking scheme. Changes in spatial frequencies (target sizes) and target temperatures along with data collection techniques is automated to expedite the process while establishing a method for achieving the required measurement which defines the range at which a given task can be accomplished.

3 Claims, 4 Drawing Sheets

AUTOMATED MINIMUM RESOLVABLE TEMPERATURE DIFFERENCE TEST FOR IMAGING INFRARED SYSTEMS

DEDICATORY CLAUSE

The invention described herein may be manufactured, used, and licensed by or for the Government for governmental purposes without the payment to me of any royalties thereon.

BACKGROUND OF THE INVENTION

Target aquisition is the detection, identification, and location of targets in sufficient detail to permit effective employment of weapons. An acceptable relationship in detection, recognition, or identification can be represented by the following:

$P_t$(of detection, recognition, or identification)=$P_1$(search)× $P_2$(contrast)×$P_3$(resolution)×$P_4$(signal/noise).

Earlier work in understanding resolution effects was postulated in about 1973 by Johnny Johnson of Army's Night Vision Lab when he introduced the principle of "bar target equivalency". This principle simply means that aquisition task level can be related to a square wave spatial frequency. Once the aquisition task level is related to spatial frequency, all of the principles of linear systems theory can be applied. Johnson found bar target equivalents for the various tasks through observer testing. Johnson's criteria are not discrete frequencies, but rather, are band upper limits for each task. Thus, the Johnson criteria are intended to be threshold criteria; i.e., "bare minimum" criteria for task accomplishment that most decidedly ignore cosmetic considerations. An example which relates to a tank recognition task depicts a tank filtered to yield 4 LP (lines pairs) per target height maximum resolution. This resolution level is associated with a 50% probability of tank recognition.

Other models identified in target recognition include the Failey model which treats noise effects as another main influence. Fred Rosell of Westinghouse conducted psychophysical tests to determine the probability of being able to detect a single bar as a function of peak signal to rms noise ratio (SNR). Only this SNR is the "display" SNR; i.e., the SNR that is perceived in an observer's mind. It turns out to be quite different from the one measured with a true rms voltmeter. This result is applied to a bar pattern by treating the detection of a single bar in the pattern as the detection of the entire pattern at the Minimum Resolvable Temperature (MRT). By repeating this bar pattern resolvability test with higher spatial frequency patters (smaller bars) additional MRT values can be generated. The resulting curve is the MRT function.

A bar pattern spatial frequency chosen to correspond to a certain "bar target equivalence" (required for a given discrimination task level) can be expressed as a function of range via simple geometric relationships. Since MRT is typically expressed as a function of angular spatial frequency ($V_T$) it can be expressed as function of range if the target height (H) and bar target equivalency criteria (N) are specified.

Once MRT is plotted as function of range, apparent target "delta T" can also be concurrently plotted as a range function. This may be done by considering atmospheric extinction effects in the spectral band of interest. The resulting plot is the apparent delta T available to the FLIR, the intersection of the two curves defines the range at which the given task can be accomplished.

A term which will be considered and which is a focal point of the disclosure is Minimum Resolvable Temperature Difference. First, it is necessary to understand for basic imaging infrared systems, the spectral windows of interest which can be defined by the electromagnetic radiation spectrum of near wave infrared (1 to 3 micrometers), medium wave infrared (3 to 5 micrometers), long wave infrared (8 to 12 micrometers), and very long wave infrared (12 micrometers and beyond). Discrete limits of these spectral windows may vary depending on the designer, however, these groupings as defined above are typically accepted for tactical military applications. Useful target energy is emitted within these spectral windows and target detection is a result of contrast with the background and can be expressed in terms of contrast radiant intensity (watts per solid angle) or temperature difference (°Kelvin) as reported by R. Balcerak in Infrared Technology Overview, Defense Advanced Research Project Agency, February, 1991. The latter is emphasized in a Minimum Resolvable Temperature Difference measurement. The objective of the Minimum Resolvable Temperature Difference test is to find the lowest apparent temperature difference between a target and the background that can be resolved by a given imaging infrared system. In other words, how sensitive is the imaging infrared sensor system to targets that are barely discernible from the background. Bar targets consisting of line pairs are employed as shown in Prior Art, FIG. 2 of Drawing. Variations in spatial frequencies manipulate target size. Spatial frequency and target size are inversely proportional such that higher spatial frequencies result in smaller targets. Consequently, small targets require a more pronounced temperature difference than do large targets. For many imaging infrared sensors, target size is important in addition to target signature. The more target in the field of view the better in accordance with the Balcerak report. Typically, 3 operators are employed in the prior art technique to measure an imaging infrared system's Minimum Resolvable Temperature Difference, and the results are averaged. To understand what it is, postulate a test where a given bar pattern temperature difference is allowed to increase until it is just resolvable by the observer viewing the image on a conventional display as shown in Prior Art, FIG. 3 of Drawing. The corresponding temperature difference for this particular pattern is the Minimum Resolvable Temperature Difference for that particular spatial frequency. Target sizes are varied and the process can be conducted for both hot and cold targets. By repeating this bar pattern resolvability test with higher spatial frequency patterns (smaller bars), additional Minimum Resolvable Temperature Difference values can be generated. The resulting curve is the Minimum Resolvable Temperature Difference merit function as shown in Prior Art, FIG. 4 of Drawing. With data obtained from a Minimum Resolvable Temperature Difference test, system performance is then expressed in terms of range provided target height (H) and bar target equivalency criteria (N) are specified as shown in Prior Art, FIG. 5 of Drawing. Since the Minimum Resolvable Temperature Difference function is the delta T "demanded" by the imaging infrared system, the intersection of the two curves defines the range at which the given task can be accomplished as shown in Prior Art, FIG. 6 of Drawing.

Measurement of an imaging infrared sensor's Minimum Resolvable Temperature Difference grew out of the need to characterize the system's performance capability (resolution and signal to noise ratio). Prior art methods to obtain Minimum Resolvable Temperature Difference tests are time consuming and inaccurate. Tests typically require several days to complete, and results are measured as a function of the individual operators' visual acuity. Attempts to successfully automate a Minimum Resolvable Temperature Difference test for imaging infrared systems have been elusive. However, accomplishment of such an endeavor would greatly enhance testing efficiency, and lower time and cost currently consumed by accepted techniques employed throughout industry and Government laboratories today.

An object of this invention is to provide an Automated Minimum Resolvable Temperature Tester.

A further object of this invention is to provide an Automated Minimum Resolvable Temperature Tester which employs the use of tracker based algorithms and automated collection techniques (in place of laboratory personnel) to measure the system's Minimum Resolvable Temperature Difference at various spatial frequencies.

Still a further object of this invention is to provide the use of a tracker-type system to resolve bar targets which comprises heating or cooling a target such that a temperature difference between the target and the background is apparent; subsequently, the temperature will then be decreased until the algorithm can no longer resolve the target.

An additional object of this invention is to employ an Automated Minimum Resolable Temperature Tester in a tracker-type system which utilizes a correlation tracking scheme wherein changes in spatial frequencies (target sizes) and target temperatures along with data collection techniques is automated to expedite the process while establishing a method for the measurement.

SUMMARY OF THE INVENTION

The Automated Minimum Resolvable Temperature Difference Tester is designed to measure the minimum resolvable temperature difference for staring and scanning imaging infrared systems at various spatial frequencies and store measured data without operator supervision. The system requires only a setup operation which includes an initial spatial frequency and resolvable temperature difference. System specifications such as the nyquist frequency (the frequency at which no useful information is transmitted) may also be calculated and inputted. It is envisioned that a stored reference will be obtained with each change in spatial frequency. The incoming signal will be compared with the referenced image and the central processing unit will determine if a temperature increment or a spatial frequency increment is required. The temperature at which a bar target is no longer resolvable will be stored as the temperature difference for that spatial frequency and the central processing unit will call for a new bar target. The Automated Minimum Resolvable Temperature Difference Tester completes its task once the nyquist frequency is reached. An operation cycle of the invention is defined in the specification under Sequential Operations which will be best understood in conjunction with reviewing FIG. 1 of the Drawing.

DESCRIPTION OF THE PREFERRED EMBODIMENT(S)

A term mentioned hereinabove which is a focal point of the disclosure is Minimum Resolvable Temperature Difference. The further exploitation of the term is embodied in the Automated Minimum Resolvable Temperature Difference Tester described hereinbelow which employs the use of tracker based algorithms and automated collection techniques (in place of laboratory personnel) to measure the system's Minimum Resolvable Temperature Difference at various spatial frequencies. The hypothesis is to use a tracker-type system to resolve bar targets. For the proposed system, the target will be heated or cooled such that a temperature difference between the target and the background is apparent. The temperature difference will then be decreased until the algorithm can no longer resolve the target. The candidate tracker system utilizes a correlation tracking scheme which is further described hereinbelow. Changes in spatial frequencies (target sizes) and target temperatures along with data collection techniques will be automated to expedite the process while establishing a standard method for the measurement.

First, it is necessary to understand for basic imaging infrared systems, the spectral windows of interest which can be defined by the electromagnetic radiation spectrum of near wave infrared (1 to 3 micrometers), medium wave infrared (3 to 5 micrometers), long wave infrared (8 to 12 micrometers), and very long wave infrared (12 micrometers and beyond). Discrete limits of these spectral windows may vary depending on the designer, however, these groupings as defined above are typically accepted for tactical military applications. Useful target energy is emitted within these spectral windows and target detection is a result of contrast with the background and can be expressed in terms of contrast radiant intensity (watts per solid angle) or temperature difference (°Kelvin). The latter is emphasized in a Minimum Resolvable Temperature Difference measurement. The objective of the Minimum Resolvable Temperature Difference test is to find the lowest apparent temperature difference between a target and the background that can be resolved by a given imaging infrared system. In other words, how sensitive is the imaging infrared sensor system to targets that are barely discernible from the background. A glossary is set forth below for convenience in identifying or defining other terms and abbreviations used in the specification.

GLOSSARY (1). FLIR: Forward looking infrared. Also can be a thermal imaging camera.

Figure 2:
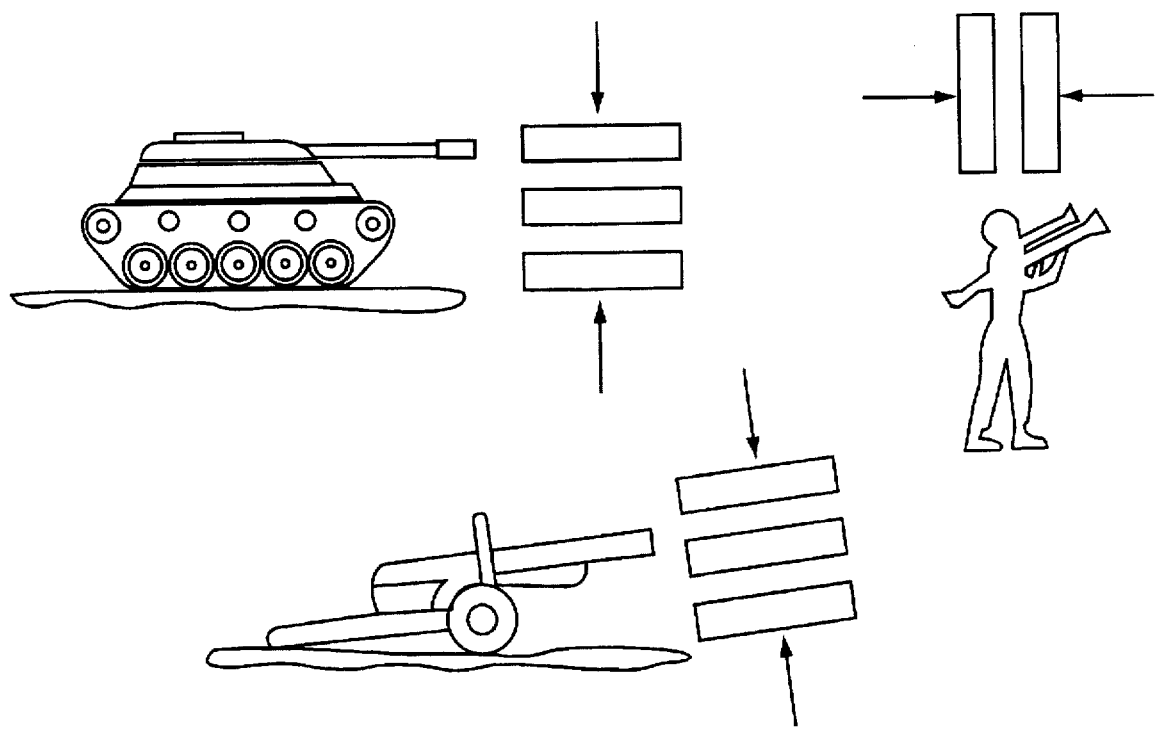
FIG. 2 depicts bar target equivalency criteria.
Figure 3:
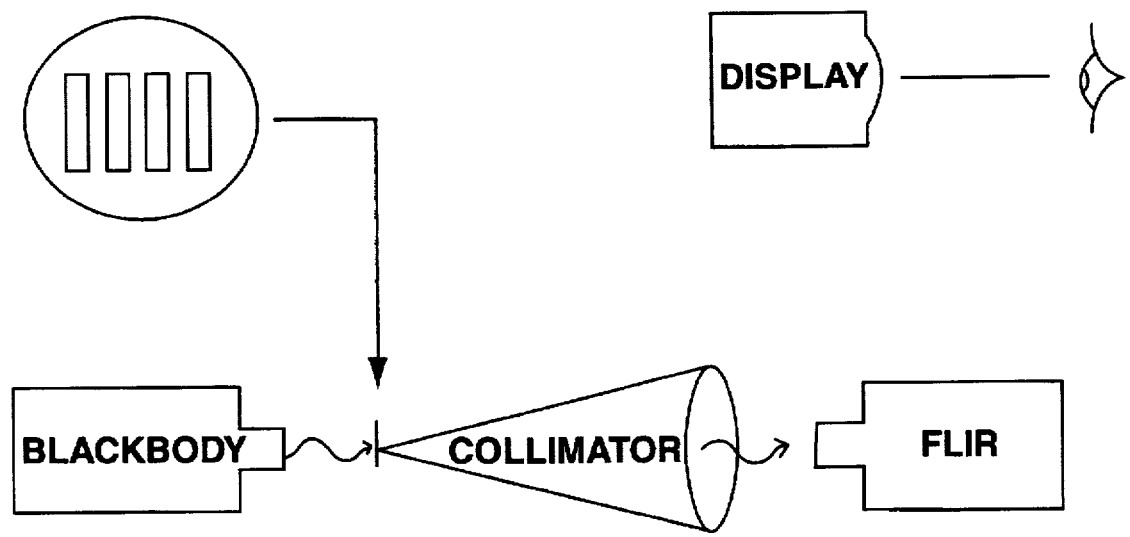
FIG. 3 depicts a minimum resolvable temperature difference test configuration.
Figure 4:
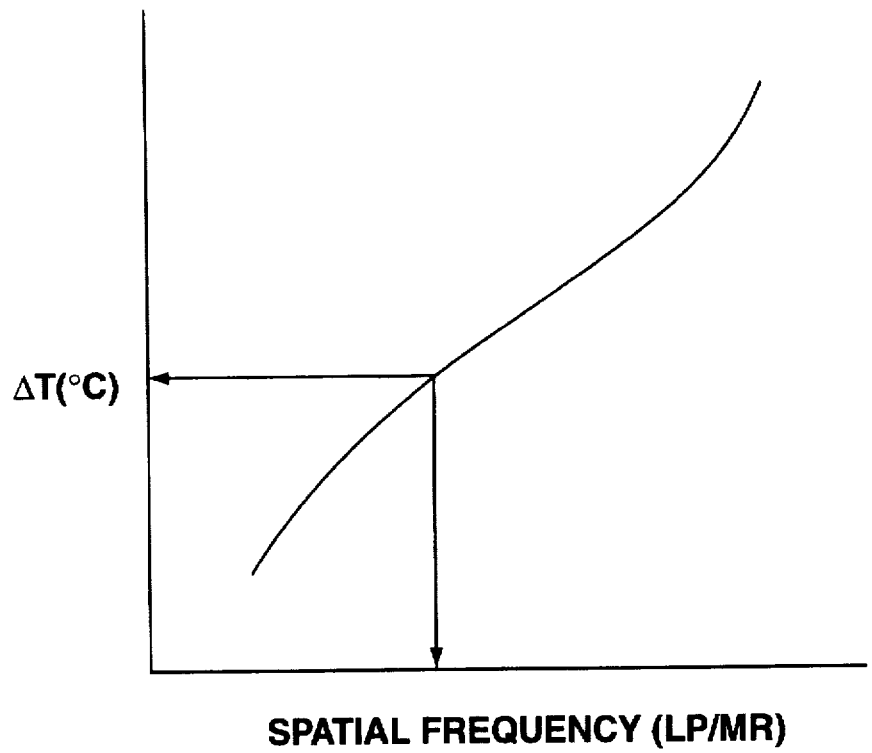
FIG. 4 depicts a minimum resolvable temperature difference curve.
Figure 5:
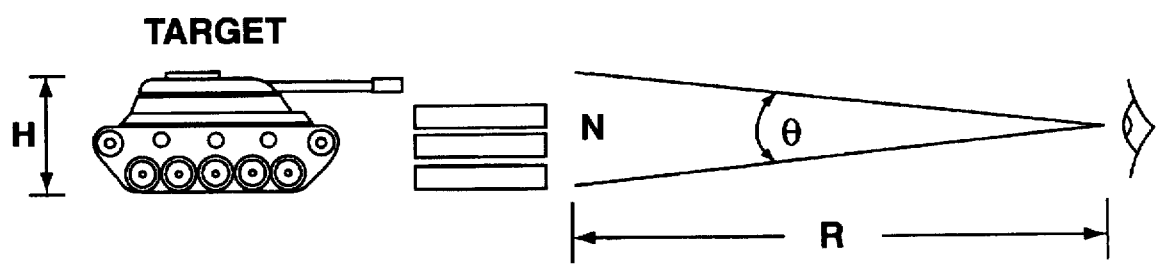
FIG. 5 depicts spatial frequency equivalence to range.
Figure 6:
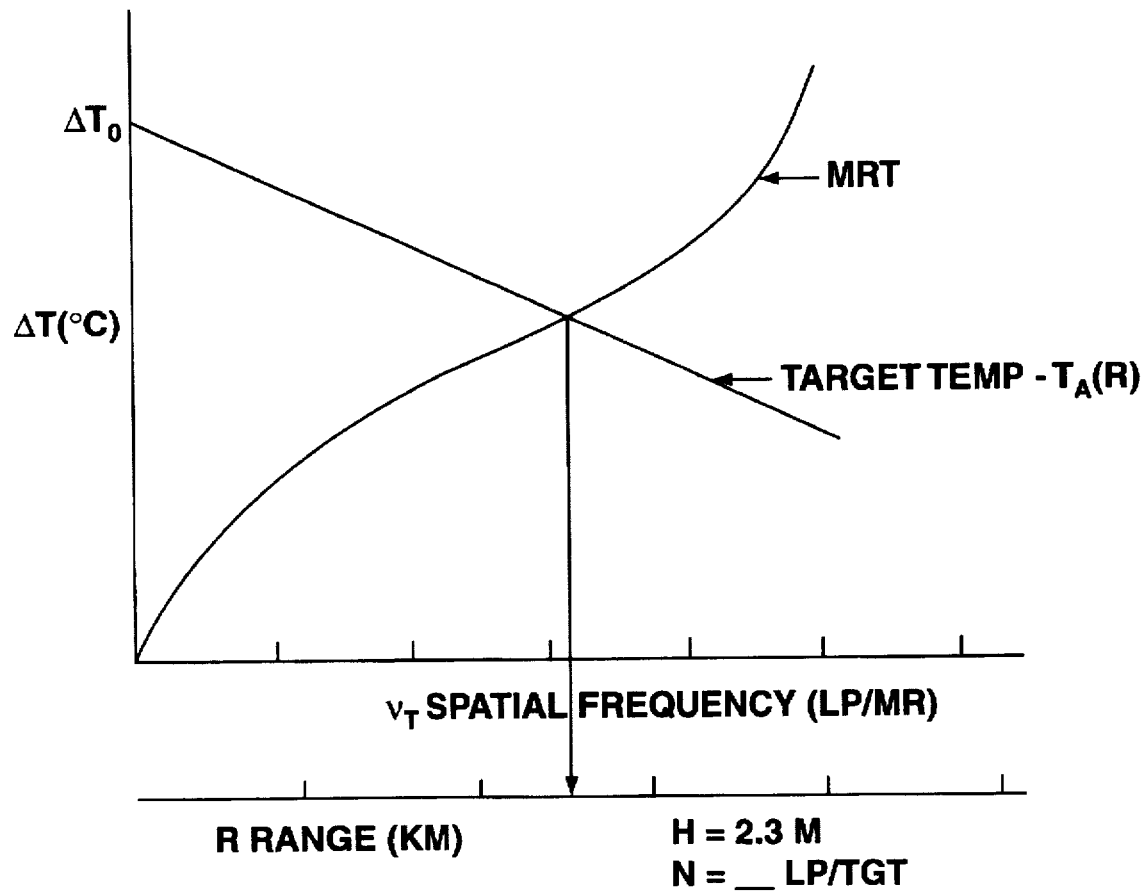
FIG. 6 depicts range performance prediction.

(2). LP: Line pairs in bar target, three line pairs=black bar+white bar repeated three times represents a tank. Also, can represent an artillery piece as shown in FIG. 2. Two line pairs, vertically aligned represents a standing soldier with a rocket launcher.

(3). Nyquist: The point at which an individual detector can no longer process useful information about the image.

(4). Spatial Frequency: LP/MR, line pairs/milliradian=cycles/milliradian.

(5). Target angle=θ=H/R.

(6). Target frequency=N(LP/TARGET).

(7). Angular frequency=$V_T$=N/θ=RN/H , R=($V_T$H)/N.

Table 1 below lists the elements of the automated minimum resolvable temperature difference determination device 10 shown in FIG. 1 of the drawing. See Automated MRTD, Sequential Operations, and Glossary of specification.

TABLE 1

| Element or Item No. | Identity | Input | Output |
|---|---|---|---|
| 12 | KEY BOARD | from operator, or initialization of test | to 14 |
| 14 | STORE DATA | from 12 & 16 | to 16 |
| 16 | REFERENCE | from 14 & 16 | to 14 & 18; interaction, with 14 & 18 |
| 18 | CPU | from 16, 20, 22, & 36 | to 16 & 20 |
| 20 | TEMPERATURE COMPARATOR | from 18 | to 18 & 22 |
| 22 | SPATIAL FREQUENCY COMPARATOR | from 20 | to 18 & 28 |
| 24 | INCREMENT TARGET SIZE | from 20 & 26 | to 30 |
| 26 | RESET TEMP. | from 28 | to 24 |
| 28 | INCREMENT TEMPERATURE | from 22 | to 26 & 30 |
| 30 | COLLIMATOR | from 24, 28, & 32 | to 34 |
| 31 | BAR TARGET | from 24 & 28 | to 34 |

TABLE 1-continued

| Element or Item No. | Identity | Input | Output |
|---|---|---|---|
| 32 | BLACK BODY | | to 30 |
| 34 | SENSOR SYSTEM | from 30 | to 36 |
| 36 | VIDEO PROCESSOR | from 34 | to 38 |
| 38 | MRTD | from 36 | to 39 |
| 39 | TO DESIGNATED USER | from 38 | to storage or recorder |

Table 2 below lists the elements of the automated resolvable temperature determination device 10 shown in FIG. 1 of the drawing. This table provides a functional statement with description of each element whereas Table 1 provides applicable inputs and outputs of elements and interaction between elements as applicable.

TABLE 2

AUTOMATED MRTD

ELEMENT 12 - KEY BOARD: Standard computer equipment to be used for setup, control, and initialization of test.
ELEMENT 14 - STORE DATA: Record in permanent memory results of automated MRTD tests.
ELEMENT 16 - REFERENCE: A stored image (most likely a bar target) of various target sizes.
ELEMENT 18 - CPU: The central processing unit of the computer is the control center for the automated MRTD and provides all facets of monitoring, comparing and recording of data.
ELEMENT 20 - TEMPERATURE COMPARATOR: This item combines both hardware and software to produce a mechanism for increasing and decreasing the target's apparent temperature difference with the background.
ELEMENT 22 - SPATIAL FREQUENCY COMPARATOR: This item combines hardware and software to produce a mechanism for increasing and decreasing the target's physical dimension.
ELEMENT 24 - INCREMENT TARGET SIZE: This item is enabled by the drive mechanism associated with ELEMENT 22. A target increment can be an increase or decrease in target size.
ELEMENT 26 RESET TEMP: This item elevates or lower a target's temperature to a predetermined steady state level that is easily discernible by the automated system.
ELEMENT 28 - INCREMENT TEMPERATURE: This item is enabled by the drive mechanism associated with. ELEMENT 20. A temperature increment can be an increase or decrease in a target's apparent temperature difference.
ELEMENT 30 - COLLIMATOR: An optical instrument consisting of a well corrected objective lens with an illuminated slit at its focal plane.
ELEMENT 31 - BAR TARGET: Represents a target which is to be modified by outputs from elements 24 and 28 which is outputted by collimator 30 to sensor 34 whose output goes to video processor 36 which outputs a MRTD 38 for bar target which can be outputted to a designated user 39.
ELEMENT 32 - BLACKBODY: An ideal body that completely absorbs all radiant energy striking it.
ELEMENT 34 - SENSOR SYSTEM- Any infrared imaging system being tested. The performance capability of the sensor system is captured in the results of the automated MRTD.
ELEMENT 36 - VIDEO PROCESSOR: This item combines both hardware and software. to produce a mechanism for comparing video imagery with a stored reference. May also be referred to as a video tracker.
ELEMENT 38 - MRTD: The results of the automated test. This figure of merit is representative of the infrared imaging sensor's performance capability.
ELEMENT 39 - TO DESIGNATED USER: Video imagery of the data under test may be provided to a designated user concurrently throughout the test. This imagery may be stored or recorded for future analysis.

With further reference to the Figures of the Drawings, FIG. 2, FIG. 3, FIG. 4, FIG. 5, and FIG. 6 illustrate Prior Art techniques and methods as related to bar target equivalency criteria, minimum resolvable temperature difference test configuration, minimum resolvable temperature difference curve, spatial frequency equivalence to range, and range performance prediction respectively.

Correlation Tracking

Correlation trackers measure the relative displacement between two different images of the same scene. One of the images is called the reference, and may represent a measurement made at an earlier time. The other image is called the received image, and usually is derived from a sensor viewing the live scene. Correlation trackers can be designated to a target location within the scene by a human operator, then continue to track the target alone during the tracking mission. Such is the case with the proposed Automated Minimum Resolvable Temperature Difference tester. A tracker in its simplest form is a device that looks at a confined signature, determines what is the target in that signature, and generates an error signal proportional to the displacement of that target from the system centerline. Algorithms for trackers including correlation trackers are user dependent and vary from programmer to programmer. Generally, a correlation tracker algorithm can be defined as follows. The stored reference-image is s(x,y) defined over a region S. The received image r(x,y), displaced from the reference and containing noise, is given by the equation:

$$r(x,y) = As(x-x_0, y-y_0) + n(x,y) \quad (1)$$

wherein

A = an unknown constant $(x_0, y_0)$ = the horizontal and vertical translation between s and r n = the receiver noise The image, r, is defined over a region, R, which usually is larger than S and contains it. The tracking loop is designed to shift the sensor axis to bring the received signal r(x,y) into registration with the stored reference s(x,y), i.e. to drive $(x_0, y_0)$ to zero. Thus, it is necessary to form error signals that makes good estimates of the tracking errors $x_o$, $y_o$.

The cross-correlation function between s and r is:

$$c(x,y) = \frac{\int s(u,v) r(u + x, v + y) du dv}{\{\int [s(u,v)]^2 du dv \int [r(u,v)]^2 du dv\}^{1/2}} \quad (2)$$

wherein the integrations are over the region S.

Figure 1:
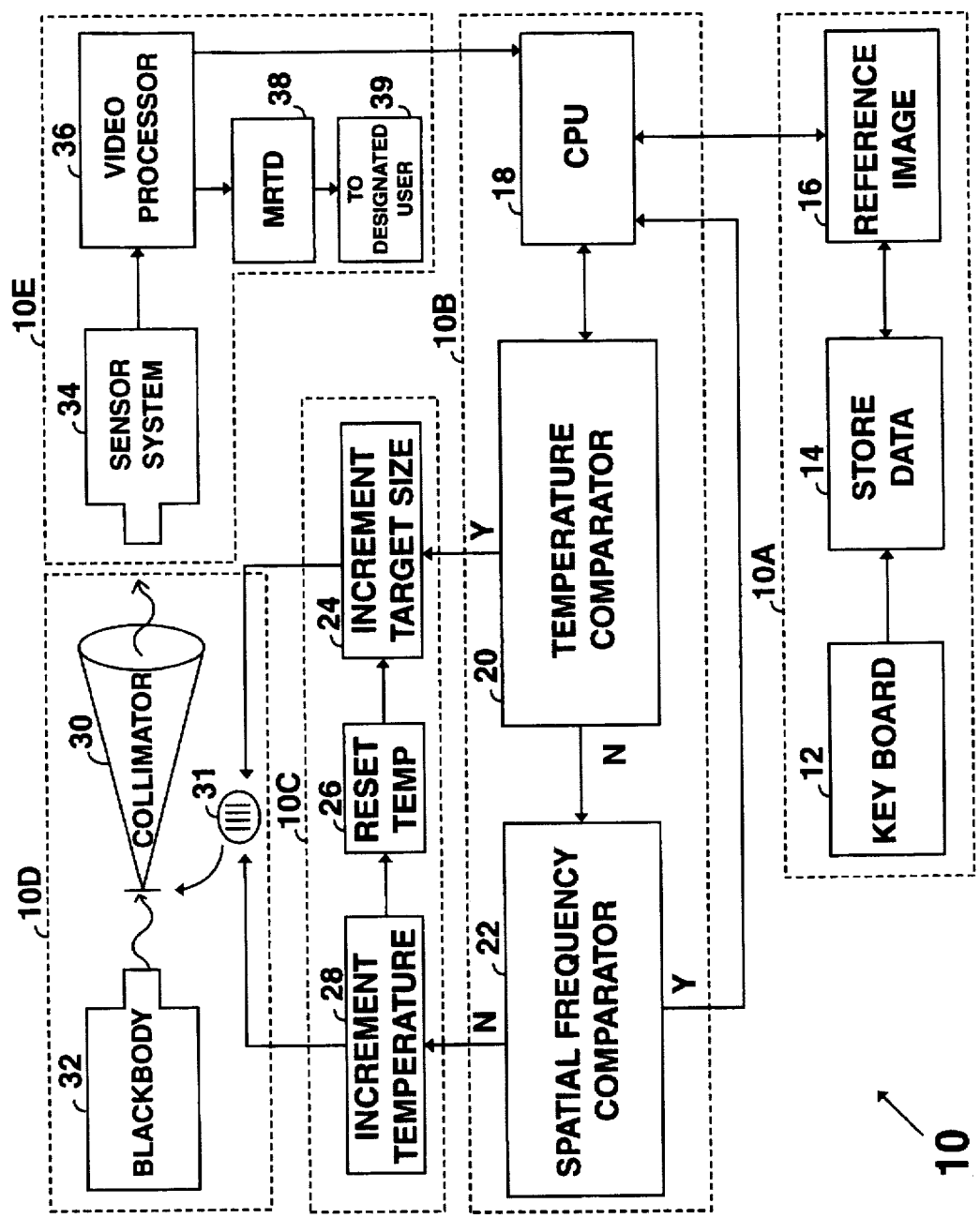
FIG. 1 depicts the automated minimum resolvable temperature difference determination device of the invention for imaging infrared systems.

With further reference to FIG. 1 of drawing, the automated minimum resolvable temperature difference determination device 10 for imaging infrared system is best understood by reviewing a first subsystem 10 A, a second subsystem 10 B, a third subsystem 10 C, a fourth subsystem 10 D, and a fifth subsystem 10 E and the interrelationships of the subsystems to achieve automatic operation of the device in determining the required measurements which define the range at which a given task can be accomplished. For example, the blackbody 32 of subsystem 10 D can be the background blackbody of a target from a live scene or it can be the background blackbody of a bar target which is looked at by a forward looking infrared camera or a sensor under test wherein comparison of stored reference information in the form of algorithms or algorithms, which represent bar targets or their equivalents, are made with interchangeable target plates mounted on automatic target wheels which are modified by outputs from element 28 and element 24 to change their appearance at the focal point of the collimator. This modified bar target appearance results in the MRTD output from the video processor. Typically, the described set up employs state of the art fixtures which includes an automatic translation stage in combination with a modulator, a cavity blackbody for noise equivalent irradiance (NEI) measurements, a He—Ne laser for focusing and boresighting, and a differential blackbody wherein a computer interacts with the cavity blackbody for NEI measurements, the differential blackbody, and a collimator to determine MRTD for a FLIR under test which has output to a display. Such a test set as described above is best understood by reviewing prior art illustration and teachings of FIG. 2, FIG. 3, FIG. 4, FIG. 5, and FIG. 6 and the Brief Description of the Drawing.

Subsystem 10 A comprises key board 12 for inputting data to begin operation to store data 14 which has interaction to reference image 16. Subsystem 10 B comprises a computer with a central processing unit (CPU) 18, a temperature comparator 20, and a spatial frequency comparator 22. Subsystem 10 C comprises increment target size 24, reset temperature 26, and increment temperature 28. Subsystem 10 D comprises collimator 30, bar target 31, and blackbody 32. Subsystem 10 E comprises sensor system 34, video processor 36, and minimum resolvable temperature difference (MRTD) 38 for output to designated user 39 (not shown in detail). User could be a weapon systems to employ the output and required measurement which defines the range and coordinates at which a task can be accomplished.

Sequential Operations

1. Begin operation with inputted data, i.e. spatial frequency, target temperature, nyquist frequency, etc., to 12 of FIG. 1.
2. Store reference image, to 14 of FIG. 1.
3. CPU 18 compares incoming images from video processor 36 with stored reference image 16. Is there an apparent temperature difference? If Yes—Go to 24 of FIG. 1. If No—Go to 22 of FIG. 1.
4. Increment temperature. Go to 20 of FIG. 1.
5. Reset temperature and increment spatial frequency. Does new spatial frequency equal nyquist? If Yes—Go to 18 of FIG. 1. If No—Go to 16 of FIG. 1.
6. Stop by input to computer, 18 of FIG. 1.

BENEFITS OF THE INVENTION

A majority of the future imaging infrared systems to be developed will be deployed in tactical military applications. However, it is reasonable to assume that out-year requirements will eventually evolve to the commercial industry. Despite commercial interest, the need the measure Minimum Resolvable Temperature Difference of future weapon systems will become more and more demanding. By century end, the Army, Navy, Air Force and Marines will deploy tens of thousands of new and existing imaging infrared systems, and over the next 15 years more than 500,000 weapon systems using imaging infrared technology will be produced. Many of these planned activities are identified below in Table 3.

TABLE 3

Expected Military Applications for Imaging Infrared Technology

| ARMY | NAVY | AIR FORCE |
|---|---|---|
| AADEOS | AAAM missile | ADBFLIR |
| Javelin Missile | Advanced HARM | ATF |
| Javelin CLU | AIWS | Falcon Eye |
|  | AMRAAM |  |
| ATACMS IRTGSM | Avionics System |  |
| DSPS | CIWS |  |
| FIFV | F-14D IRST |  |
| Light Helicopter | Maverick |  |
|  | NATO AAW |  |
| LOSAT | NATO Seasparrow |  |
| Abrams M1 A2 | Other Missiles |  |
| Block I11 Tank | Photonics Mast |  |
| NLOS Missile | RAM |  |
| PMS | Sidewinder |  |
| TACAWS | Shipboard IRST |  |
| ITAS | Standard Missile |  |
| TWS | Surveillance IRST |  |

Since Sixty percent of these deployments are expected to come from the Army's missile procurements, it is in the Army's best interest to address alternate methods to measure system performance or automated existing techniques. Either approach benefits all of industry. It is anticipated that test costs to measure minimum resolvable temperature differences for each imaging infrared system can be lowered by as much as 10 fold with the implementation of the proposed ideas outlined in this paper. The savings are realized because operator and personnel labor are greatly diminished with the majority of the projected costs being reduced to set-up times. Another advantage of the Automated Minimum Resolvable Temperature Difference Tester is the ability of numerous laboratories to compare measured data on an apples to apples scale since operator biases are nonexistent. Current Minimum Resolvable Temperature Difference tests are time consuming and inaccurate. Automation of the Minimum Resolvable Temperature Difference test for imaging infrared systems will greatly enhance testing efficiency and lower labor and overall costs associated with current techniques employed throughout industry and Government laboratories today.

I claim:

1. An automated minimum resolvable temperature difference determination device for imaging infrared systems comprising:

(A) a first subsystem which comprises an input section, a store data section, and a reference section, said input section having means for inputting initial data to said store data section, said store data section in communication with said reference section, said store data section and said reference section having input and output means for inputting and receiving reference target images of a plurality of targets;

(B) a second subsystem which comprises a computer section with a central processing unit, a temperature comparator section, and a spatial frequency comparator section, said computer section with a central processing unit having input and output means between said reference section, said temperature comparator section, and said spatial frequency comparator section to achieve comparing an incoming target image with a selected said stored reference target image;

(C) a third subsystem which comprises an increment target size section, an increment temperature section, and a reset temperature section, said increment target size having input means from said temperature comparator for a temperature difference detected between stored reference target image and an incoming target image, said increment temperature section having an input means from said spatial frequency comparator section for a no temperature difference detected between stored reference target image and an incoming target image, said increment temperature section having output means to said reset temperature section and to a collimator section, said reset temperature section having output means to said increment target size section, and said increment target size section having output means to a collimator section to achieve resetting temperature and increment spatial frequency;

(D) a fourth subsystem which comprises a collimator, said collimator having inputs from said increment temperature section and said increment target size section, said collimator aligned for receiving an image from a live scene and said inputs from said increment temperature section and said increment target size section, said collimator providing a combined signature of a received image and a stored reference image for processing by a sensor section and a correlation tracker section; and, (E) a fifth subsystem which comprises a sensor section and a correlation tracker section, said sensor system aligned with said collimator and having output to said correlation tracker section, said correlation tracker section having a video processor with an algorithm output to said computer section with a central processing unit and a minimum resolvable temperature difference output to a designated user of the required measurement to define the range at which a given task can be accomplished by said designated user.

2. The automated minimum resolvable temperature difference determination device for imaging infrared systems as defined in claim 1 wherein said first subsystem provides stored reference to said second subsystem which compares an incoming image with stored reference image and wherein said temperature comparator determines a temperature difference which is outputted to said increment temperature of said third subsystem which outputs to said collimator and said aligned sensor system and said video processor which subsequently outputs a minimum resolvable temperature difference to said designated user of the required measurement to define the range at which a given task can be accomplished.

3. The automated minimum resolvable temperature difference determination device for imaging infrared systems as defined in claim 1 wherein said first subsystem provides stored reference to said second subsystem which compares an incoming image with stored reference image and wherein said temperature comparator determines a no temperature difference which is outputted to said spatial frequency comparator of said second subsystem which outputs to said collimator and said aligned sensor system and said video processor which subsequently outputs to said computer of said second subsystem and said computer outputs to said reference of said first subsystem and said reference outputs to said computer with a central processing unit of said second subsystem which stops test when new spatial frequency does not equal nyquist.

* * * * *